US012726676B2

(12) United States Patent
Kim et al.

(10) Patent No.: US 12,726,676 B2
(45) Date of Patent: Sep. 1, 2026

(54) WIRELESS TRANSMISSION DEVICE, DISPLAY DEVICE AND DATA TRANSMISSION METHOD AND STREAM PROCESSING METHOD THEREOF

(71) Applicant: SAMSUNG ELECTRONICS CO., LTD., Suwon-si (KR)

(72) Inventors: Namhyun Kim, Suwon-si (KR); Gaeun Kim, Suwon-si (KR); Kyungwoo Kim, Suwon-si (KR); Kyumin Kim, Suwon-si (KR); Bora Park, Suwon-si (KR); Kangsik Yoon, Suwon-si (KR); Duhe Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/932,163

(22) Filed: Oct. 30, 2024

(65) Prior Publication Data

US 2025/0080798 A1 Mar. 6, 2025

Related U.S. Application Data

(63) Continuation of application No. PCT/KR2024/013062, filed on Aug. 30, 2024.

(30) Foreign Application Priority Data

Aug. 30, 2023 (KR) ........................ 10-2023-0114965
Dec. 21, 2023 (KR) ........................ 10-2023-0187992

(51) Int. Cl.
*H04N 21/488* (2011.01)
*H04N 21/236* (2011.01)
(Continued)

(52) U.S. Cl.
CPC ....... *H04N 21/4402* (2013.01); *H04N 21/236* (2013.01); *H04N 21/42607* (2013.01); *H04N 21/4343* (2013.01); *H04N 21/4884* (2013.01)

(58) Field of Classification Search
CPC ........... H04N 21/4402; H04N 21/4343; H04N 21/42607; H04N 21/4884; H04N 21/236
See application file for complete search history.

(56) References Cited

U.S. PATENT DOCUMENTS 7,893,995 B2 2/2011 Hong et al.
8,577,205 B2 * 11/2013 Barton ............... H04N 21/4147 725/151

(Continued)

FOREIGN PATENT DOCUMENTS

JP 2007-96811 A 4/2007
JP 2009-4877 A 1/2009

(Continued)

OTHER PUBLICATIONS

International Search Report (PCT/ISA/210) and Written Opinion (PCT/ISA/237) issued on Dec. 20, 2024 by the International Searching Authority in International Patent Application No. PCT/KR2024/013062.

(Continued)

*Primary Examiner* — Pinkal R Chokshi
(74) *Attorney, Agent, or Firm* — Sughrue Mion, PLLC

(57) ABSTRACT

A transmission device includes a communication interface configured to perform communications with an external device and at least one display device, a memory configured to store analog data received from the external device, a signal processor, and a processor configured to control the signal processor to decode the analog data, separate the decoded analog data into analog audio data, analog video data, and analog additional data, convert the analog audio data, the analog video data, and the analog additional data, (Continued)

START
RECEIVE ANALOG DATA FROM EXTERNAL DEVICE ~S610
ACQUIRE ANALOG AUDIO DATA, ANALOG VIDEO DATA, AND ANALOG ADDITIONAL DATA FROM ANALOG DATA ~S620
CONVERT EACH OF ANALOG AUDIO DATA, ANALOG VIDEO DATA, AND ANALOG ADDITIONAL DATA TO DIGITAL DATA ~S630
CONFIGURE DIGITAL TRANSPORT STREAM INCLUDING PLURALITY OF PACKETS BY SEPARATELY PACKETIZING DIGITAL AUDIO DATA, DIGITAL VIDEO DATA, AND DIGITAL ADDITIONAL DATA, RESPECTIVELY ~S640
TRANSMIT DIGITAL TRANSPORT STREAM TO AT LEAST ONE DISPLAY DEVICE ~S650
END separated from one another, respectively, to digital audio data, digital video data, and digital additional data, configure a digital transport stream including a plurality of packets by separately packetizing the digital audio data, the digital video data, and the digital additional data, respectively, and transmit, using the communication interface, the digital transport stream to the at least one display device.

12 Claims, 9 Drawing Sheets

(51) Int. Cl.
*H04N 21/426* (2011.01)
*H04N 21/434* (2011.01)
*H04N 21/4402* (2011.01)

(56) References Cited

U.S. PATENT DOCUMENTS 8,897,304 B2 11/2014 Hong et al.
9,288,648 B2 3/2016 Lee et al.
2004/0234244 A1* 11/2004 Matthews ............ H04N 9/7921 386/E9.009
2007/0008427 A1* 1/2007 Hong .................. H04N 21/435 348/E7.02
2008/0051027 A1 2/2008 Lee
2008/0240230 A1* 10/2008 Oxman ............. H04N 21/4383 375/240.01
2008/0320539 A1* 12/2008 Ohkita ................ H04N 21/485 725/118
2009/0077039 A1* 3/2009 Narahara .............. G06F 3/0236
2010/0165912 A1 7/2010 Funabiki et al.
2010/0272419 A1* 10/2010 Wang .................. G11B 27/105 386/248
2012/0254917 A1* 10/2012 Burkitt ................ H04N 21/458 725/40
2016/0205424 A1 7/2016 Ramsdell et al.
2021/0377330 A1* 12/2021 Trayanov ........... H04N 21/8456

FOREIGN PATENT DOCUMENTS

JP 2009-296402 A 12/2009
KR 10-0334502 B1 4/2002
KR 10-2006-0014605 A 2/2006
KR 10-2007-0006240 A 1/2007
KR 10-2008-0019445 A 3/2008
KR 10-2008-0102768 A 11/2008
KR 10-2012-0016466 A 2/2012
KR 10-2014-0033256 A 3/2014

OTHER PUBLICATIONS

Communication dated Jun. 30, 2026, issued by the European Patent Office in European Application No. 24860466.2.

* cited by examiner

WIRELESS TRANSMISSION DEVICE, DISPLAY DEVICE AND DATA TRANSMISSION METHOD AND STREAM PROCESSING METHOD THEREOF

CROSS-REFERENCE TO RELATED APPLICATIONS

This application is a continuation application of International Application No. PCT/KR2024/013062, filed on Aug. 30, 2024, which claims priority to Korean Patent Application No. 10-2023-0114965, filed on Aug. 30, 2023, and to Korean Patent Application No. 10-2023-0187992, filed on Dec. 21, 2023, in the Korean Intellectual Property Office, the disclosures of which are incorporated by reference herein in their entireties.

BACKGROUND

1. Field

The present disclosure relates generally to a wireless transmission device, a display device, and the data transmission method and stream processing method thereof, and more particularly, to a wireless transmission device that transmits analog data and additional data in a wireless manner, a display device, and the data transmission method and stream processing method thereof.

2. Description of Related Art

In accordance with development of electronic technologies, homes may use display devices such as, but not limited to, televisions (TVs), tablet computers, smart phones, or the like. A related display device may display content received from various content sources. For example, the display device may display various screens, such as, but not limited to, various broadcast content screens received through a set-top box (STB), video on demand (VOD) content screens received through an Internet, game screens performed by game players, personal computer (PC) screens, or the like.

The related display devices may process digital content. However, the related display devices may also process analog content. In such a case, if receiving analog data from an external device, a wireless transmission device (e.g., the STB) may convert the analog data to digital data and transmit the same to the display device.

SUMMARY

According to an aspect of the present disclosure, a transmission device includes a communication interface configured to perform communications with an external device and at least one display device, a memory configured to store analog data received from the external device using the communication interface, a signal processor, and a processor communicatively coupled with the communication interface, the memory, and the signal processor. The processor is configured to control the signal processor to decode the analog data, separate the decoded analog data into analog audio data, analog video data, and analog additional data, convert the analog audio data, the analog video data, and the analog additional data, separated from one another, respectively, to digital audio data, digital video data, and digital additional data, configure a digital transport stream including a plurality of packets by separately packetizing the digital audio data, the digital video data, and the digital additional data, respectively, and transmit, using the communication interface, the digital transport stream to the at least one display device.

According to an aspect of the present disclosure, a display device includes a communication interface configured to perform communications with a wireless transmission device, a memory storing instructions, a signal processor, a display, and one or more processors communicatively coupled with the signal processor, the display, and the memory. The one or more processors are configured to execute the instructions to transmit, using the communication interface to the wireless transmission device, a selection signal indicating a selection of at least one additional data included in analog content provided by an external device to the wireless transmission device, receive, using the communication interface from the wireless transmission device, a digital transport stream corresponding to analog content including the selected additional data, store the received digital transport stream in the memory, control the signal processor to acquire a video signal, an audio signal, and additional information by decoding digital audio data, digital video data, and digital additional data, acquired from the digital transport stream, and control the display to output at least a part of the additional information together with the video signal based on a user input.

According to an aspect of the present disclosure, a data transmission method of a wireless transmission device includes receiving analog data from an external device, acquiring analog audio data, analog video data, and analog additional data from the received analog data, converting the analog audio data, the analog video data, and the analog additional data, respectively, to digital audio data, digital video data, and digital additional data, configuring a digital transport stream including a plurality of packets by separately packetizing the digital audio data, the digital video data, and the digital additional data, respectively, and transmitting the digital transport stream to at least one display device.

According to an aspect of the present disclosure, a transport stream processing method of a display device includes transmitting a selection signal for selecting at least one of additional data included in analog content to a wireless transmission device; receiving a digital transport stream corresponding to the analog content including the selected additional data from the wireless transmission device; acquiring digital audio data, digital video data, and digital additional data by depacketizing the received digital transport stream; acquiring a video signal, an audio signal, and additional information by respectively decoding the acquired digital audio data, digital video data, and digital additional data; and outputting at least a part of the additional information together with the video signal based on a user input.

According to an aspect of the present disclosure, a computer-readable recording medium including a program for executing a data transmission method of a wireless transmission device, wherein the method includes receiving analog data from an external device, acquiring analog audio data, analog video data, and analog additional data from the received analog data, converting the analog audio data, the analog video data, and the analog additional data, respectively, to digital data, configuring a digital transport stream including a plurality of packets by separately packetizing the converted digital audio data, digital video data, and digital additional data, respectively, and transmitting the digital transport stream to at least one display device.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
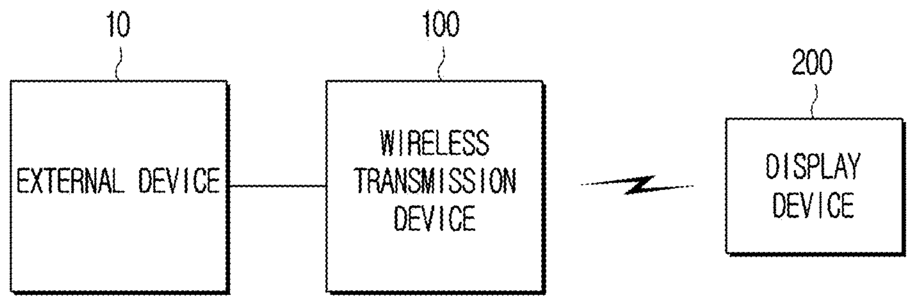
FIGS. 1 and 2 are diagrams of an operation of a wireless transmission device, according to an embodiment.

Terms used in the present disclosure are briefly described, and the present disclosure is then described in detail.

General terms currently widely used are selected as terms used in embodiments of the present disclosure in consideration of their functions in the present disclosure, and may be changed based on the intentions of those skilled in the art or a judicial precedent, the emergence of a new technique, or the like. In addition, in a particular case, terms arbitrarily chosen by an applicant may exist. In this case, the meanings of such terms are mentioned in detail in corresponding description portions of the present disclosure. Therefore, the terms used in the present disclosure may be defined on the basis of the meanings of the terms and the contents throughout the present disclosure rather than simple names of the terms.

In the present disclosure, an expression "have", "may have", "include", "may include", or the like, may indicate the existence of a corresponding feature (e.g., a numerical value, a function, an operation, or a component such as a part), and may not exclude the existence of an additional feature.

In the present disclosure, the expression "A or B", "least one of A and/or B" or "one or more of A and/or B" or the like, may include all possible combinations of items enumerated together. For example, "A or B", "at least one of A and B" or "at least one of A or B" may indicates all of 1) a case where at least one A is included, 2) a case where at least one B is included, or 3) a case where both of at least one A and at least one B are included.

Expressions "first", "second", and the like, used in the present disclosure may qualify various components regardless of the sequence or importance of the components. The expression is used only to distinguish one component from another component, and does not limit the corresponding component.

In case that any component (e.g., a first component) is mentioned to be "(operatively or communicatively) coupled with/to" or "connected to" another component (e.g., a second component), it is to be understood that any component may be directly coupled to another component or may be coupled to another component through still another component (e.g., a third component).

A term of a singular number may include its plural number unless explicitly indicated otherwise in the context. It is to be understood that a term "include", "formed of", or the like used in the present disclosure may indicate the presence of features, numerals, steps, operations, components, parts, or combinations thereof, mentioned in the present disclosure, and does not preclude the presence or addition of one or more other features, numerals, steps, operations, components, parts, or combinations thereof.

In the present disclosure, a "module" or a "~er/~or" may perform at least one function or operation, and be implemented by hardware, software, or a combination of hardware and software. In addition, a plurality of "modules" or a plurality of "~ers/~ors" may be integrated in at least one module to be implemented by at least one processor (not shown) except for a "module" or a "~er/or" that may need to be implemented by particular hardware.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, various embodiments of the present disclosure are described with reference to the accompanying drawings.

Figure 2:
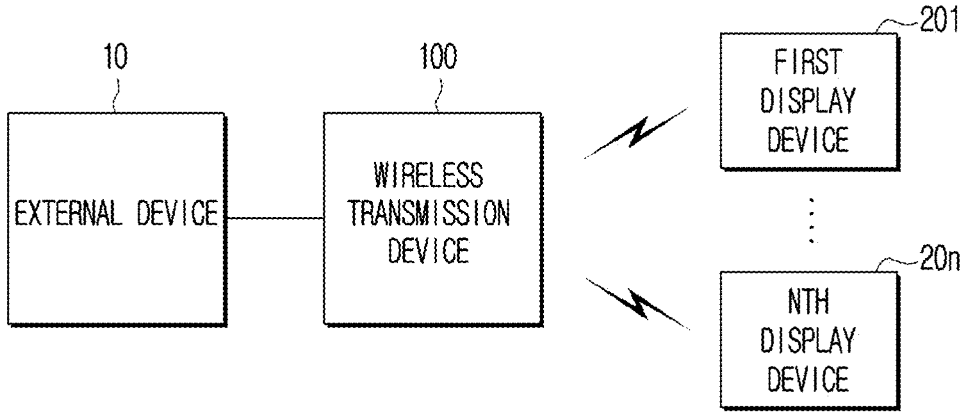

FIGS. 1 and 2 are diagrams of an operation of a wireless transmission device, according to an embodiment. FIG. 1 shows a case where image data is transmitted from a wireless transmission device to a display device, and FIG. 2 shows a case where the image data is transmitted from the wireless transmission device to the plurality of display devices.

Referring to FIG. 1, a wireless transmission device 100 may be connected to an external device 10 and a display device 200. The wireless transmission device 100 may be a component performing communication with the display device 200 in a wireless manner to transmit various data and/or signals.

The wireless transmission device 100 may include a plurality of ports to which various cables, such as, but not limited to, a power cable, an optical cable, a high-definition multimedia interface (HDMI) cable, a radio frequency (RF) cable, and a local area network (LAN) cable, may be connected. The wireless transmission device 100 may be connected to the various external devices 10 through the respective ports.

The external device 10 may be and/or may include a component providing various contents. For example, the external device 10 may be implemented in various ways, such as, but not limited to, a broadcasting station server, a personal computer (PC), a laptop PC, a smartphone, a tablet PC, a set-top box (STB), a cable broadcast server, a media player, a game console, or the like. The external device 10 may alternatively be described as a content source. Some of the external devices 10 may provide analog content.

The wireless transmission device 100 may be connected to the external device 10 in a wired and/or a wireless manner. The wireless transmission device 100 may select one external device 10 based on a user selection and/or control of the display device 200, receive the content provided by the external device 10, and transmit the same to the display device 200 in a wireless manner.

In case of using the wireless transmission device 100, the display device 200 may receive the content from various external sources through the wireless transmission device 100, even though an external source may not be directly connected to the display device 200 through a plurality of connection lines.

The wireless transmission device 100 may be referred to as a one-connect box, a one-connect device, a source integration device, a source connection device, or the like. In addition, the wireless transmission device 100 may be implemented to be connected to the display device 200 or another device through one wired cable rather than in a wireless manner. However, the present disclosure is not limited in this regard. For example, the present disclosure describes that the wireless transmission device 100 may be connected to the display device 200 in a wireless manner.

The wireless transmission device 100 may receive the analog content from the external device 10 in case of selecting the external device which may provide the analog content, or selecting the analog content of the external device which may provide various content such as digital content and/or the analog content. The analog content may include various analog data such as analog audio data, analog video data, and analog additional data.

The analog additional data may include user data used to help a user to watch a video or provide various information to the user in case that the analog audio data and the analog video data are displayed through the display device 200.

The additional data may include at least one of wide screen signaling (WSS) data, teletext (TTX) data, subtitle data such as a subtitle for the hearing impaired, foreign language subtitle data, or aspect ratio setting data of the display device.

The wide screen signaling (WSS) may be and/or may include digital metadata embedded in an invisible part of an analog television (TV) signal to indicate an aspect ratio of an image, or the like. As used herein, the aspect ratio may indicate a ratio of the width and height of the image, and may be expressed, for example, as two numbers separated by a colon, such as 16:9. The aspect ratio may expressed as x:y. In this case, x indicates the width of the image and y indicates the height of the image. For example, a TV broadcaster may transmit the image in two (2) formats (e.g., 4:3 and 16:9) by using the WSS. In this case, a television set may optimize the received image by displaying the image in a full screen, a letterbox, a widescreen, a zoom letterbox, or the like. In an embodiment, a movie theater screen may mainly use an aspect ratio of 1.85:1 or 2.4:1, and a video screen may mainly use an aspect ratio of 4:3 or 16:9.

A teletext (TTX) may indicate an information service provided by a television broadcaster and was first developed in the United Kingdom (UK) in the 1970s. The TTX may provide various text-based information such as, but not limited to, various news, weather, TV schedules, subtitle information, or the like. Major broadcasters of each country may provide their own TTX services and may also provide advertisements such as, but not limited to, travel information. The TTX may also provide a quiz, a simple game, the subtitle for the hearing impaired, and a foreign language subtitle in addition to regularly updated current news and sports news. Unlike a web service having a speed slowing down based on the number of users, a speed of a TTX service may not slow down regardless of the number of users.

A vertical blanking interval (VBI) may be conventionally used to transmit the analog data. The VBI may indicate a time it takes for a scanning line to scan from the bottom of a screen, reach the end of the screen, and then return to its starting point at the top of the screen to find a next screen field in case that the image is displayed on the screen of the display device 200 (e.g., the TV). That is, data transmitted during the VBI time may not be displayed on the screen of the display device 200 and conventionally, the additional data may thus be transmitted during the VBI time. However, a VBI section may be relatively short, and accordingly, it may be difficult to transmit a large amount of additional data. In addition, the additional data may be transmitted through the VBI section regardless of a situation of a receiving side, and as such, may be a burden for every receiving device that may need to process the additional data.

Accordingly, the wireless transmission device 100, according to various embodiments of the present disclosure, may decode the analog data received from the external device 10, convert the received analog data to the digital data, and transmit the same to at least one of the display devices 200 in a wireless manner.

As shown in FIG. 2, a plurality of display devices (e.g., a first display device 201 to an n-th display device **20*n*, where n is a positive integer greater than zero (0)) may be connected to the wireless transmission device 100. In this case, the wireless transmission device 100 may convert the received analog data to the digital data and transmit the same to the plurality of display devices 201 to 20*n*** in a wireless manner.

In this case, the wireless transmission device 100 may transmit, to each of the plurality of display devices 201 to **20*n*, the data selectively signal-processed based on its communication connection state with each of the plurality of display devices 201 to 20n and a user input signal. Here, the communication connection state may be and/or may include information indicating whether the communication connection is established and/or disconnected. However, the present disclosure is not limited in this regard, and the communication connection state may be and/or may include maximum transmission unit (MTU) information, round trip time (RTT) information, or the like, determined between the wireless transmission device 100 and the plurality of display devices 201 to 20n**. The MTU information may indicate the maximum size of data that may be simultaneously transmitted between a plurality of devices. The MTU information may be determined based on communication performance of the device, a feature of a network connecting the devices to each other, or the like. The round trip time (RTT) information may be and/or may include information on a time it takes to transmit data between devices and receive a response.

The wireless transmission device 100 may configure different digital data corresponding to the analog data based on these various information.

A method for the wireless transmission device 100 to selectively transmit the signal-processed data to each of the plurality of display devices 201 to 20n in a wireless manner is described again in a section below. As described above, the wireless transmission device 100 may be connected to the plurality of display devices in a wireless manner. However, for convenience of explanation, the following description is provided based on the case where the wireless transmission device 100 is connected to one display device 200.

Figure 3:
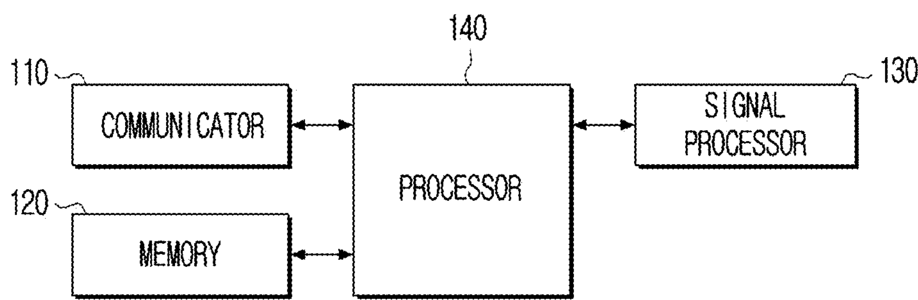
FIG. 3 is a block diagram showing a configuration of the wireless transmission device, according to an embodiment.

FIG. 3 is a block diagram showing a configuration of the wireless transmission device, according to an embodiment.

Referring to FIG. 3, the wireless transmission device 100 may include a communicator 110, a memory 120, a signal processor 130, and a processor 140.

The communicator 110 may be a component performing communication with the external device 10 or at least one display device 200. The communicator 110 may receive the analog data from the external device 10. In addition, the communicator 110 may transmit a digital transport stream to at least one display device 200 under control of the processor 140. In addition, the communicator 110 may receive the user input signal from the display device 200.

The communicator 110 may include at least one of a short-range communication module or a long-distance communication module. The communicator 110 may support establishment of a direct (e.g., wired) communication channel and/or wireless communication channel with the external device 10 or at least one display device 200, and support the communication performed through the established communication channel.

According to an embodiment, the communicator 110 may include a wireless communication module (e.g., a cellular communication module, a short-range wireless communication module, or a global navigation satellite system (GNSS) communication module) or a wired communication module (e.g., a LAN communication module, or power line communication module). The communicator 110 may communicate with the external device 10 or at least one display device 200 through a first network (e.g., short-range communication network such as Bluetooth™, wireless fidelity (Wi-Fi) direct, or infrared data association (IrDA)) or a second network (e.g., long-distance communication network such as legacy cellular network, fifth-generation (5G) network, next-generation communication network, Internet, or computer network (e.g., LAN or Wireless LAN (WAN)). The communicator 110 including these various types of communication modules, may be integrated into one component (e.g., one chip), or may be implemented as a plurality of separate components (e.g., multiple chips).

The short-range communication module (or short-range wireless communication module) may include a Bluetooth™ communication module, a Bluetooth™ low energy (BLE) communication module, a short-range wireless communication module (or a near field communication module), a WLAN (or Wi-Fi) communication module, a Zigbee communication module, an infrared data association (IrDA) communication module, a Wi-Fi direct (WFD) communication module, a ultrawideband (UWB) communication module, an Ant+ communication module, a microwave (uWave) communication module, or the like. The present disclosure is not limited in this regard, and the communicator 110 may include additional communication modules supporting additional communication protocols without departing from the scope of the present disclosure.

The long-distance communication module may include a communication module configured to perform various types of long-distance communication, and include a mobile communicator. The mobile communicator may transmit and/or receive a wireless signal with at least one of a base station, an external terminal, a server on a mobile communication network, or the like.

The memory 120 may store at least one instruction, data, program, or the like, that may be needed for an operation of the wireless transmission device 100. As an example, the memory 120 may store the analog data received from the external device 10. The memory 120 may be implemented as a memory embedded in the wireless transmission device 100, or implemented as a memory detachable from the wireless transmission device 100, based on a data storage purpose. For example, data for driving the wireless transmission device 100 may be stored in the memory embedded in the wireless transmission device 100, and data for an expansion function of the wireless transmission device 100 may be stored in the memory detachable from the wireless transmission device 100.

The memory embedded in the wireless transmission device 100 may be implemented as at least one of a volatile memory (e.g., a dynamic random access memory (DRAM), a static RAM (SRAM), or a synchronous dynamic RAM (SDRAM)), or a non-volatile memory (e.g., an one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or a solid state drive (SSD)).

The memory 120 may be implemented as one memory storing data generated from various operations in the present disclosure. However, the present disclosure is not limited thereto, and the memory 120 may be implemented to include a plurality of memories, each storing different types of data, or each storing data generated at different stages.

The signal processor 130 may be and/or may include a component signal-processing the analog data received from the external device 10 and converting the processed analog data to the digital transport stream. The signal processor 130 may decode the analog data and separate the decoded analog data into the analog audio data, the analog video data, and the analog additional data. In an embodiment, the signal processor 130 may include an analog to digital converter (ADC), a multiplexer (MUX), a demultiplexer, a decoder, or the like.

The ADC may refer to a device converting the analog data to the digital data. For example, the ADC may convert the analog data to digital audio data, digital video data, and digital additional data. The analog data may go through processes of sampling, quantization, and encoding to be digitally converted by the ADC. Each of these processes may be performed by various hardware such as a sampler, a quantizer, and an encoder. The sampling may refer to converting the analog data in a continuous form to a digital value in a discontinuous form along a time axis. According to Shannon's sampling theorem, original analog data may be reproduced from sampled data in case that the sampling is performed on a signal having a limited frequency band at a regular interval at a rate of twice the maximum frequency or more. For example, the sampling that may need to be performed at a rate of 4000 Hz or more to digitize a frequency in a 10 to 2000 Hz band.

The quantization may refer to converting the data, on which the sampling is performed along the time axis, to the digital value in the discontinuous form along an amplitude axis. The quantization may divide an interval of the sampled data into predetermined quantization levels along the amplitude axis, and assign a unique value to each level. For example, the interval may be divided into 256 quantization levels if a unit of value that may be expressed in the quantization is 8 bits. As another example, the interval may be divided into 1024 quantization levels if the unit is 10 bits. In this case, more precise expression may be possible because the amplitude axis may be divided into more intervals in the case of 10 bits than in the case of 8 bits.

The encoding may refer to the data converted by the sampling and the quantization being converted to a binary number.

The multiplexer may perform multiplexing by adding a predetermined synchronization signal to the converted digital data. For example, the multiplexer may configure a digital transport stream (TS) by multiplexing the converted digital audio data, digital video data, and digital additional data. That is, the multiplexer may packetize the digital data by multiplexing header data to payload data. As used herein, the packetization may refer to adding the header data to the payload data, and then compressing the same. In this case, the payload data may include at least one of the digital audio data, the digital video data, or the digital additional data. In addition, the header data may include data on an address of the wireless transmission device 100 and an address of the display device 200.

The processor 140 may be and/or may include a component connected to each component of the wireless transmission device 100 and controlling overall operations of the wireless transmission device 100. The processor 140 may be implemented as a digital signal processor (DSP), a microprocessor, a graphics processing unit (GPU), an artificial intelligence (AI) processor, a neural processing unit (NPU), or the like. However, the processor 140 is not limited thereto, may include at least one of a central processing unit (CPU), a micro controller unit (MCU), a micro processing unit (MPU), a controller, an application processor (AP), a communication processor (CP) or an advanced reduced instruction set computer (RISC) machine (ARM) processor, or may be defined by these terms. In addition, the processor 140 may be implemented in a system-on-chip (SoC) or a large scale integration (LSI) in which a processing algorithm may be embedded, or may be implemented in a form of an application specific integrated circuit (ASIC) or a field programmable gate array (FPGA).

In addition, the processor 140 for executing an artificial intelligence model according to an embodiment may be implemented through a combination of a processor and software, the processor including a general-purpose processor such as the CPU, the AP or the DSP, a graphics-only processor such as a GPU or a vision processing unit (VPU), or a processor dedicated to the artificial intelligence such as the NPU.

The processor 140 may perform the control to process input data based on a predefined operation rule or the artificial intelligence model stored in the memory 120. Alternatively or additionally, the processor 140 may be and/or may include a dedicated processor (or the processor dedicated to the artificial intelligence), and in this case, the processor 140 may be designed to have a hardware structure specialized for processing a particular artificial intelligence model. For example, hardware specialized for processing the artificial intelligence model may be designed as a hardware chip such as an ASIC or the FPGA.

The processor 140 may be implemented as the dedicated processor. In this case, the processor 140 may be implemented to include a memory for implementing an embodiment of the present disclosure, or may be implemented to include a memory processing function for using an external memory. One or more processors 140 may be implemented.

In case of receiving the analog data from the external device 10 through the communicator 110, the processor 140 may store the received analog data in the memory 120. The processor 140 may control the signal processor 130 to decode the analog data and separate the decoded data into the analog audio data, the analog video data, and the analog additional data. The processor 140 may control the signal processor 130 to digitally convert the analog audio data, the analog video data, and the analog additional data, separated from one another, respectively, to the digital audio data, the digital video data, and the digital additional data. The processor 140 may control the signal processor 130 to configure the digital transport stream including a plurality of packets by separately packetizing the converted digital audio data, digital video data, and digital additional data, respectively. The processor 140 may control the communicator 110 to transmit the digital transport stream to at least one display device 200.

Figure 4:
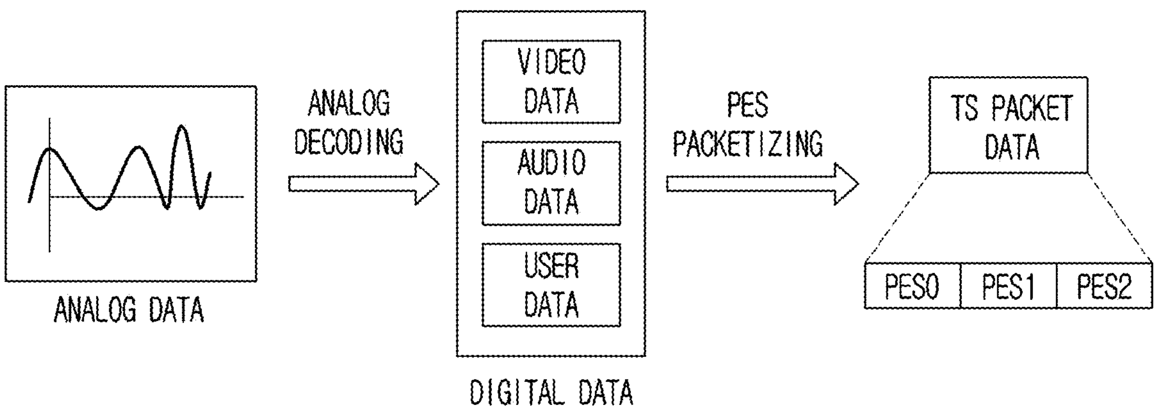
FIG. 4 is a diagram of an operation of the wireless transmission device, according to an embodiment.

FIG. 4 is a diagram of an operation of the wireless transmission device, according to an embodiment.

Referring to FIG. 4, in case of receiving the analog data from the external device 10, the processor 140 may control the signal processor 130 to decode the received analog data to separate the decoded data into the analog audio data, the analog video data, and the analog additional data, and digitally convert the analog audio data, the analog video data, and the analog additional data, separated from one another, respectively, to the digital audio data, the digital video data, and the digital additional data. In addition, the processor 140 may control the signal processor 130 to packetize each of the digital audio data, the digital video data, and the digital additional data into a separate packetized elementary stream (PES), and configure the digital transport stream (TS) including the plurality of packetized PES (e.g., a first PES PES0, a second PES PES1, and a third PES PES2).

For example, as shown in FIG. 4, the processor 140 may control the signal processor 130 to packetize the digital video data into the first PES PES0, packetize the digital audio data into the second PES PES1, and packetize the digital additional data into the third PES PES2. In addition, the processor 140 may control the signal processor 130 to include three packetized PES of PES0, PES1, and PES2, in the transport stream (TS). An arrangement order of the packets corresponding to the respective data may be changed in various ways.

In this case, the processor 140 may separately packetize the plurality of additional data into the different PESs if the digital additional data includes the plurality of different types of additional data. For example, the digital additional data may include the WSS, the TTX and the subtitle data. In this case, the processor 140 may control the signal processor 130 to packetize the digital video data into the first PES PES0, the digital audio data into the second PES PES1, the WSS into the third PES PES2, the TTX into a fourth PES PES3, and the subtitle data into a fifth PES PES4. In addition, the processor 140 may control the signal processor 130 to configure the digital transport stream (TS) including the packetized PES0, PES1, PES2, PES3, and PES4.

The processor 140 may control the communicator 110 to provide guidance information on available additional data to at least one display device 200. The guidance information may include the list and related information of the additional data available from the wireless transmission device 100 to the display device 200.

The processor 140 may receive a selection signal for receiving at least one of the plurality of additional data from at least one display device 200 through the communicator 110. In this case, the analog additional data may include the plurality of different types of additional data. The processor 140 may select the additional data to be transmitted to at least one display device 200 based on the received selection signal in case of receiving the selection signal from at least one display device 200 through the communicator 110. The processor 140 may control the signal processor 130 to packetize each selected additional data into the digital additional data and include the packetized data in the digital transport stream.

For example, the wireless transmission device 100 may be connected to a plurality of display devices (e.g., a first display device 201 and a second display device 202), and the additional data that may be provided by the wireless transmission device 100 may include the WSS, the subtitle data, the foreign language subtitle data, a TV program schedule, the travel information, and news data. In this case, the processor 140 may receive the selection signal for the WSS and the foreign language subtitle data from the first display device 201, and receive the WSS, the subtitle data for the hearing impaired, and the selection signal for the TV program schedule from the second display device 202, through the communicator 110.

In this case, the processor 140 may select the WSS and the foreign language subtitle data among the additional data available from the wireless transmission device 100, and control the signal processor 130 to packetize the selected additional data into the digital additional data and include the same in a first digital transport stream. The processor 140 may select the WSS and subtitle data for the hearing impaired, and TV program schedule data among the additional data available from the wireless transmission device 100, and control the signal processor 130 to packetize the selected additional data into the digital additional data and include the same in a second digital transport stream. The processor 140 may transmit the first digital transport stream to the first display device 201, and transmit the second digital transport stream to the second display device 202, respectively, through the communicator 110.

If there is a display device that does not transmit the selection signal among the plurality of display devices connected to the wireless transmission device 100, the processor 140 may control the signal processor 130 to configure the digital transport stream by packetizing only the digital audio data and the digital video data. Alternatively or additionally, if the memory 120 stores data for a predetermined default selection signal, the processor 140 may select the additional data based on the default selection signal, and control the signal processor 130 to packetize the selected default additional data into the digital additional data and include the same in the digital transport stream.

In this way, the wireless transmission device 100 may configure the digital transport stream by selectively packetizing the additional data into the digital additional data based on the selection signal transmitted from each of the display devices 200, and transmit each configured digital transport stream to each display device 200.

The processor 140 may group the display devices by the display device transmitting the same selection signal based on the selection signal in a case in which the plurality of display devices 200 are connected to the communicator 110 and each of the plurality of display devices 200 transmits the selection signal. In such a case, the processor 140 may compare and analyze the selection signals received from the plurality of display devices 200, and classify the plurality of display devices 200 by grouping the devices by the display device transmitting the same selection signal. The processor 140 may control the signal processor 130 to configure the plurality of digital transport streams including the additional data different for each classified group. The processor 140 may control the communicator 110 to transmit the plurality of digital transport streams for each classified group. In this case, the display devices belonging to the same group may receive the same digital transport stream.

Therefore, the wireless transmission device 100 may only need to configure the digital transport stream for as many as the number of groups of the classified display devices without a need to configure the digital transport stream for each of the display devices 200 connected to the wireless transmission device 100, thus potentially reducing consumption of resources such as, for example, the memory 120 and the processor 140.

Figure 5:
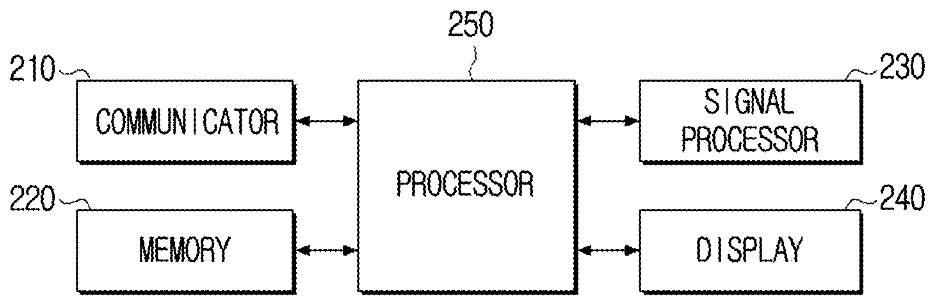
FIG. 5 is a block diagram showing a configuration of a display device, according to an embodiment.

FIG. 5 is a block diagram showing a configuration of the display device, according to an embodiment.

Referring to FIG. 5, the display device 200 may include a communicator 210, a memory 220, a signal processor 230, a display 240, and a processor 250. The display device 200 may include and/or may be similar in many respects to the wireless transmission device 100 described above with reference to FIG. 3, and may include additional features not mentioned above. Consequently, repeated descriptions of the display device 200 described above with reference to FIG. 3 may be omitted for the sake of brevity.

The communicator 210 may be and/or may include a component performing communication with a wireless transmission device 100. The communicator 210 may transmit a selection signal for receiving at least one of a plurality of additional data to the wireless transmission device 100, and receive a digital transport stream from the wireless transmission device 100. The digital transport stream may include at least one of digital audio data, digital video data, or digital additional data. Here, the digital additional data may include at least one of WSS data, TTX data, subtitle data such as a subtitle for the hearing impaired, foreign language subtitle data, or aspect ratio setting data of the display device.

The memory 220 may store at least one instruction, data, program, or the like, required for an operation of the display device 200. The memory 220 may store the digital transport stream transmitted by the wireless transmission device 100.

The signal processor 230 may acquire a video signal, an audio signal, or additional information by signal-processing the digital transport stream transmitted from the wireless transmission device 100. For example, the signal processor 230 may extract header data and payload data by signal-processing the digital transport stream. In this case, the payload data may include at least one of the digital audio data, the digital video data, or the digital additional data.

The display 240 may be and/or may include a component for displaying the video signal and the additional information. The display 240 may be implemented as a display including a self-light emitting element or a display including a non self-light emitting element and a backlight. For example, the display 240 may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, or a quantum dot light-emitting diode (QLED) display.

The processor 250 may be and/or may include a component connected to each component of the display device 200 and configured to control overall operations of the display device 200. The processor 250 may transmit the selection signal for selecting at least one of the additional data included in analog content provided by an external device 10 connected to the wireless transmission device 100 to the wireless transmission device 100 through the communicator 210.

The processor 250 may store the received digital transport stream in the memory 220 in case of receiving the digital transport stream corresponding to the analog content including the selected additional data from the wireless transmission device 100 through the communicator 210. The processor 250 may control the signal processor 230 to acquire the digital audio data, the digital video data, and the digital additional data from the digital transport stream, and acquire the video signal, the audio signal, and the additional information by decoding each acquired data. The video signal may include a plurality of image frames that may be displayed on the display 240.

The processor 250 may control the display 240 to output at least a part of the additional information together with the video signal based on a user input. The additional information may be the subtitle data. In this case, the processor 250 may control the display 240 to output the image frame included in the video signal by synchronizing the image frame with an output timing of the subtitle information.

The processor 250 may control the communicator 210 to transmit the selection signal for selecting whether to receive each additional data to the wireless transmission device 100. For example, the display device 200 may transmit, to the wireless transmission device 100, the selection signal for the reception among the plurality of additional data available from the wireless transmission device 100. In this case, the wireless transmission device 100 may transmit, to the display device 200, the digital transport stream including the selected additional data based on the selection signal. The transmitted digital transport stream may include the plurality of additional data selected by the selection signal.

The processor 250 may control the signal processor 230 to acquire the video signal, the audio signal, and the additional information by decoding the digital transport stream. In this case, the additional information may be the plurality of decoded additional data. The processor 250 may control the display 240 to output the additional information selected by the user input among the additional information together with the video signal in case of receiving the user input for selecting and displaying the additional information. That is, the processor 250 may control the display 240 to output some of the additional information selected by the user input together with the video signal instead of outputting all the additional information corresponding to the received plurality of additional data on the display 240.

The processor 250 may control the display 240 to display guidance information in case of receiving the guidance information on the additional data available from the wireless transmission device 100 through the communicator 210. The user may check the guidance information and select the additional data desired by the user. The processor 250 may control the communicator 210 to transmit the selection signal for at least one additional data to the wireless transmission device 100 in case of selecting at least one additional data based on the guidance information.

In an embodiment, the display device 200 may receive the user input through the communicator 210 or various interfaces. For example, the user may input the user input or the selection signal to the display device 200 by using a remote control or a device such as a mobile phone or a tablet PC, installed with a remote control application. The device may transmit the user input or the selection signal to the communicator 210 by using a wireless communication network such as, but not limited to, infrared (IR) communication, Bluetooth™ communication, a Wi-Fi communication, RF communication, wireless LAN communication, near field communication (NFC), radio frequency identification (RFID) communication, or Zigbee communication. For example, the communicator 210 may include an IR signal reception module receiving an IR signal from the device.

Here, the IR communication may refer to a communication method of transmitting the signal by using an electromagnetic wave in a wavelength range of about 700 nanometers (nm) to about 1 mm. An IR signal may have a wide wavelength band, and may thus be used for various purposes such as an infrared detector, a distance measurement, an infrared surveillance device, and an infrared sensor in addition to signal transmission and reception. For example, an optical communication network may use the infrared signal having a wavelength band of about 1.530 micrometers (μm) to about 1.565 μm.

The display device 200 may also receive the user input by using an interface that may include various buttons and touch screens disposed on a main body of the display device 200. The user may use the various buttons and touch screens disposed on the main body of the display device 200 to input, to the display device 200, the selection signal to be transmitted to the wireless transmission device 100 or the user input for displaying the additional information.

In an embodiment, the display device 200 may further include a speaker. The processor 250 may control the signal processor 230 to acquire the video signal, the audio signal, and the additional information, output the acquired video signal and additional information through the display 240, and output the audio signal through the speaker. If the display device 200 includes the speaker, the display device 200 may further include various components such as an audio decoder, an audio output mixer, an audio signal processor, and an amplifier circuit to process the audio signal. One or more speakers may be provided, and in case of being implemented as the plurality of speakers, the speakers may be arranged symmetrically on an appearance of the main body to thus output audio information in all directions, that is, in substantially all the directions of 360 degrees.

Figure 6:
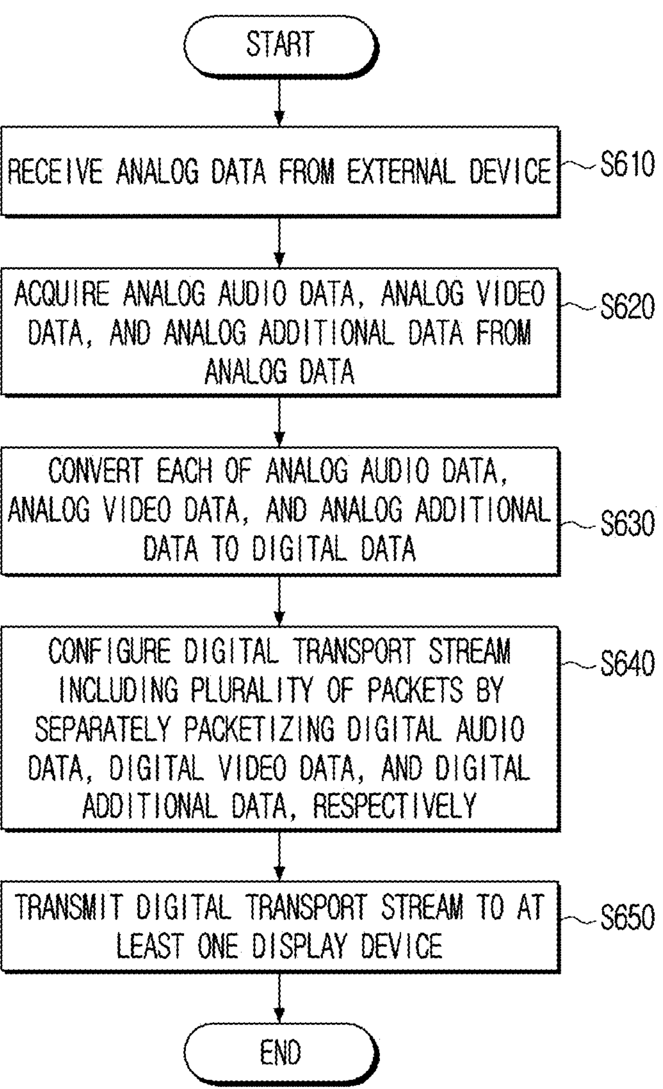
FIGS. 6 and 7 are flowcharts of a data transmission method of a wireless transmission device, according to an embodiment.
Figure 7:
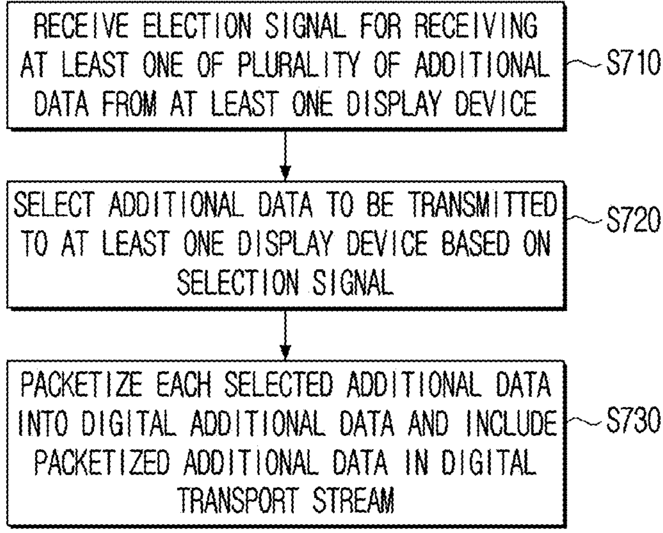

FIGS. 6 and 7 are flowcharts of a data transmission method of a wireless transmission device, according to an embodiment.

Referring to FIG. 6, the wireless transmission device may receive analog data from an external device (operation S610). Here, the analog data may include at least one of analog audio data, analog video data, or analog additional data. In addition, the analog additional data may include at least one of WSS data, TTX data, subtitle data for the hearing impaired, foreign language subtitle data, or aspect ratio setting data of a display device.

The wireless transmission device may acquire the analog audio data, the analog video data, and the analog additional data from the received analog data (operation S620). In addition, the wireless transmission device may digitize the analog audio data, the analog video data, and the analog additional data, respectively, and convert these data to digital audio data, digital video data, and digital additional data (operation S630). In this case, the wireless transmission device may also provide guidance information on available additional data to at least one display device. The guidance information may include the list and related information of the additional data available from the wireless transmission device to the display device.

The wireless transmission device may configure a digital transport stream including a plurality of packets by separately packetizing the converted digital audio data, digital video data, and digital additional data, respectively (operation S640). In this case, the wireless transmission device may separately packetize the respective additional data if the digital additional data includes the plurality of different types of additional data.

The wireless transmission device may transmit the digital transport stream to at least one display device (operation S650). In this case, the digital transport stream transmitted from the wireless transmission device to each display device may be different for each display device. The digital transport stream transmitted from the wireless transmission device to each display device may include the same digital audio data and digital video data. However, the digital additional data included in the digital transport stream may be different for each display device. The digital additional data is further described below with reference to FIG. 7.

FIG. 7 shows a method of configuring the digital transport stream including the plurality of packets based on a selection signal of the display device in case that the analog additional data includes the plurality of different types of additional data.

Referring to FIG. 7, the wireless transmission device may receive the selection signal for receiving at least one of the plurality of additional data from at least one display device in case that the analog additional data includes the plurality of different types of additional data (operation S710). For example, the plurality of additional data may be available from the wireless transmission device to the display device. In this case, the wireless transmission device may not need to transmit all the available additional data to all the display devices. The additional data required for each display device may be different. That is, the wireless transmission device may receive the selection signal for selecting the plurality of additional data and then receiving the same from each display device.

The wireless transmission device may select the additional data to be transmitted to at least one display device based on the received selection signal in case of receiving the selection signal from at least one display device (operation S720). The additional data to be transmitted to each display device may be changed based on the received selection signal. For example, the wireless transmission device may have the available additional data including the WSS, the subtitle data, the foreign language subtitle data, a TV program schedule, travel information, and news data. In this case, a certain display device may only request to receive the WSS and the foreign language subtitle data, and a certain display device may request to receive the WSS, the subtitle data for the hearing impaired, and the TV program schedule. Alternatively, the display device may not request to receive any additional data at all, or may request to receive all the additional data. In this way, the wireless transmission device may select the additional data corresponding to each display device based on the selection signal different for each display device.

The wireless transmission device may packetize each selected additional data into the digital additional data and include the packetized additional data in the digital transport stream (operation S730). In this case, the wireless transmission device may group the display devices by display device transmitting the same selection signal based on the received selection signal. In addition, the wireless transmission device may configure the plurality of digital transport streams including the additional data different for the respective groups. The wireless transmission device may transmit the plurality of digital transport streams for each classified group. In this case, the display devices belonging to the same group may receive the same digital transport stream.

Figure 8:
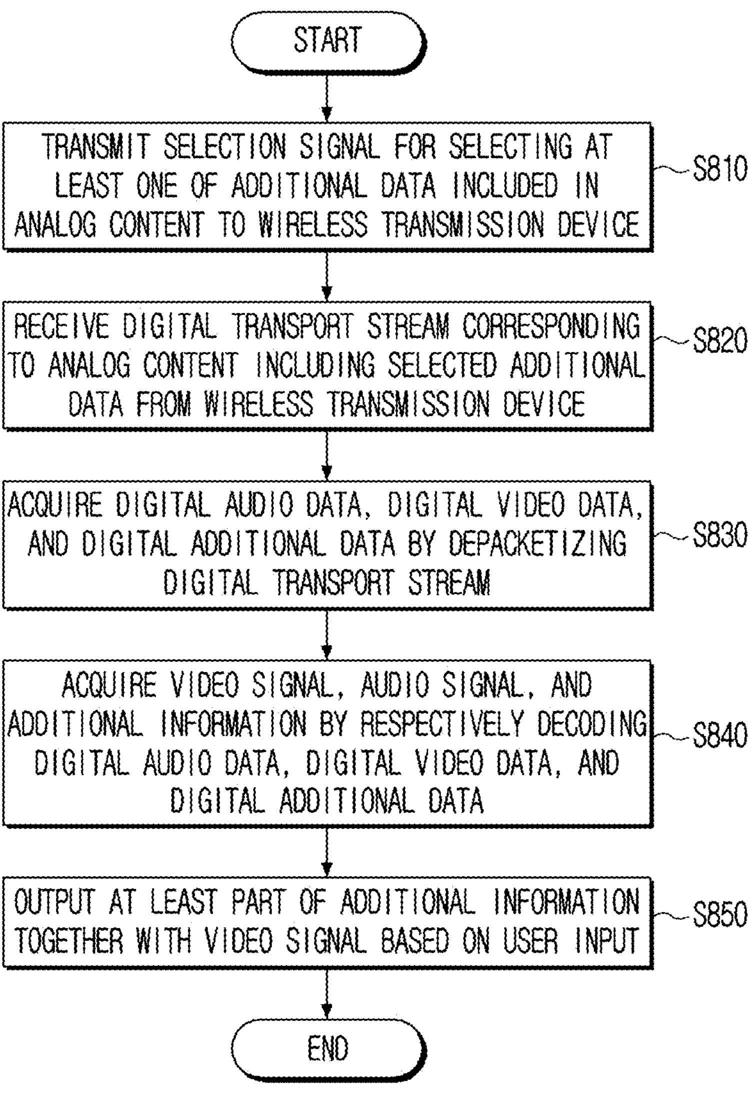
FIGS. 8 and 9 are flowcharts of a transport stream processing method of a display device, according to an embodiment.
Figure 9:
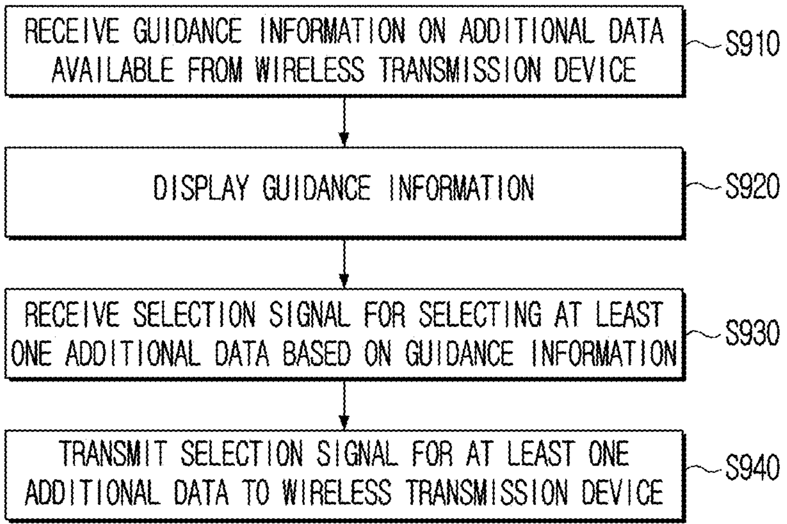

FIGS. 8 and 9 are flowcharts of a transport stream processing method of a display device, according to an embodiment.

Referring to FIG. 8, the display device may transmit a selection signal for selecting at least one of additional data included in analog content to a wireless transmission device (operation S810).

The display device may receive a digital transport stream corresponding to the analog content including the selected additional data from the wireless transmission device (operation S820). In this case, the digital transport stream may include at least one of digital audio data, digital video data, or digital additional data.

The display device may acquire the digital audio data, the digital video data, and the digital additional data by depacketizing the received digital transport stream (operation S830). Here, the digital additional data may include at least one of WSS data, TTX data, subtitle data for the hearing impaired, foreign language subtitle data, or aspect ratio setting data of the display device.

The display device may acquire a video signal, an audio signal, and additional information by respectively decoding the acquired digital audio data, digital video data, and digital additional data (operation S840). That is, the display device may signal-process the digital audio data, the digital video data, and the digital additional data, separated from one another, to thus convert the same to the video signal, the audio signal, and the additional information to be output through a display or a speaker.

The display device may output at least a part of the additional information together with the video signal based on a user input (operation S850). For example, a user may not use all the additional information in case that the additional information, which may be output together with the video signal through the display device, includes a lot of user information such as the WSS data, the TTX data, the subtitle data for the hearing impaired, and the foreign language subtitle data. In this case, the display device may receive the user input for displaying and selecting the additional information. In case of receiving the user input, the display device may output the additional information selected by the user input among the additional information together with the video signal.

FIG. 9 shows a method of the display device to transmit the selection signal for receiving the additional data available from the wireless transmission device.

The display device may receive guidance information on the additional data available from the wireless transmission device (operation S910). The guidance information may include the list and related information of the additional data available from the wireless transmission device to the display device.

The display device may display the guidance information in case of receiving the guidance information from the wireless transmission device (operation S920). The guidance information may be displayed on the display device based on a user input signal, or may be displayed on the display device in case that the display device accesses to the wireless transmission device.

The display device may receive the selection signal for selecting at least one additional data based on the guidance information (operation S930). The display device may receive the user input or the selection signal in linkage with a device such as a remote control or a mobile phone application. Alternatively, the display device may also receive the user input by using an interface such as various buttons or a touch screen disposed on a main body of the display device.

The display device may transmit the selection signal for at least one additional data to the wireless transmission device (operation S940). In this case, the display device may transmit a predetermined default selection signal to the wireless transmission device if the user does not input the selection signal.

According to an embodiment of the present disclosure, the various embodiments described above may be implemented in software including an instruction stored in a machine-readable storage medium (e.g., a computer-readable storage medium). A machine may be and/or may include a device that invokes the stored instruction from a storage medium, may be operated based on the invoked instruction, and may include the wireless transmission device according to the disclosed embodiments. In case that the instruction is executed by the processor, the processor may perform a function corresponding to the instruction directly or by using other components under control of the processor. The instruction may include a code provided or executed by a compiler or an interpreter. The machine-readable storage medium may be provided in the form of a non-transitory storage medium. Here, a term "non-transitory" may only indicate that the storage medium is tangible without including a signal, and does not distinguish whether data are semi-permanently or temporarily stored in the storage medium.

In addition, according to an embodiment of the present disclosure, the methods according to the various embodiments described above may be provided by being included in a computer program product. The computer program product may be traded as a product between a seller and a purchaser. The computer program product may be distributed in a form of the machine-readable storage medium (e.g., a compact disc read only memory (CD-ROM)), or may be distributed online through an application store (e.g., PlayStore™). In case of the online distribution, at least a portion of the computer program product may be at least temporarily stored in the storage medium such as a memory of a server of a manufacturer, a server of an application store or a relay server, or be temporarily provided.

In addition, each of the components (e.g., modules or programs) according to the various embodiments described above may include one entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, at least some of the operations may be performed in a different order or be omitted, or other operations may be added.

As set forth above, according to the wireless transmission device, the display device, and the data transmission method thereof in the various embodiments of the present disclosure, it may be possible to packetize the additional data and transmit the packetized data together in case that the analog data is converted to the digital data and transmitted in a wireless manner, thereby transmitting more additional data in the same band, and potentially preventing errors and data loss in a data transmission process.

Although the embodiments are shown and described in the present disclosure as above, the present disclosure is not limited to the above-mentioned embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A transmission device, comprising:

a communication interface configured to perform communications with an external device and at least one display device;

a memory configured to store analog data received from the external device using the communication interface;

a signal processor; and a processor communicatively coupled with the communication interface, the memory and, the signal processor, wherein the processor is configured to control the signal processor to:

decode the analog data;

separate the decoded analog data into analog audio data, analog video data, and analog additional; data, the analog additional data comprising a plurality of different types of additional data;

convert the analog audio data, the analog video data, and the analog additional data, separated from one another, respectively, to digital audio data, digital video data, and digital additional data;

transmit, using the communication interface, guidance information to the at least one display device, the guidance information indicating the plurality of different types of additional data comprised by the digital additional data;

receive, using the communication interface, a selection signal from the at least one display device, the selection signal indicating a selection of at least one of the plurality of different types of additional data;

configure a digital transport stream comprising a plurality of packets by separately packetizing the digital audio data, the digital video data, and the digital additional data corresponding to the selection of the at least one of the plurality of different types of additional data, respectively; and transmit, using the communication interface, the digital transport stream to the at least one display device.

2. The transmission device of claim 1, wherein the analog additional data comprises at least one of wide screen signaling (WSS) data, teletext (TTX) data, subtitle data, foreign language subtitle data, or aspect ratio setting data.

3. The transmission device of claim 1, wherein the processor is further configured to:

select, from the analog additional data, selected additional data to be transmitted to the at least one display device based on the selection signal; and control the signal processor to packetize each of the selected additional data into the digital additional data and add the packetized data in the digital transport stream.

4. The transmission device of claim 3, wherein the at least one display device comprises a plurality of display devices, and wherein the processor is further configured to:

group the plurality of display devices into one or more groups based on the selection signal transmitted by each of the plurality of display devices, wherein the plurality of display devices are communicatively coupled with the communication interface, and wherein each of the plurality of display devices transmits a corresponding selection signal, control the signal processor to configure a plurality of digital transport streams comprising distinct additional data corresponding to each of the one or more groups, and transmit, using the communication interface, the plurality of digital transport streams to each of the one or more groups.

5. A display device, comprising:

a communication interface configured to perform communications with a wireless transmission device;

a memory storing instructions;

a signal processor;

a display; and one or more processors communicatively coupled with the signal processor, the display, and the memory, wherein the one or more processors are configured to execute the instructions to:

receive, using the communication interface from the wireless transmission device, guidance information indicating a plurality of different types of additional data comprised in analog content provided by an external device to the wireless transmission device;

transmit, using the communication interface to the wireless transmission device, a selection signal indicating a selection of at least one type of additional data from among the plurality of different types of additional data comprised in the analog content;

receive, using the communication interface from the wireless transmission device, a digital transport stream corresponding to the analog content comprising the selected additional data;

store the received digital transport stream in the memory;

control the signal processor to acquire a video signal, an audio signal, and additional information by decoding digital audio data, digital video data, and digital additional data, acquired from the digital transport stream; and control the display to output at least a part of the additional information together with the video signal based on a user input.

6. The display device of claim 5, wherein the one or more processors are further configured to execute the instructions to:

control the display to output the additional information selected by the user input among the additional information together with the video signal based on receiving the user input instructing to select and display the additional information.

7. The display device of claim 5, wherein the one or more processors are further configured to execute the instructions to:

control the display to display the guidance information; and select the at least one type of additional data, based on the guidance information.

8. The display device of claim 5, wherein the digital additional data comprises at least one of wide screen signaling (WSS) data, teletext (TTX) data, subtitle data for the hearing impaired, foreign language subtitle data, or aspect ratio setting data of the display device.

9. A data transmission method of a wireless transmission device, the data transmission method comprising:

receiving analog data from an external device;

acquiring analog audio data, analog video data, and analog additional data from the received analog; data, the analog additional data comprising a plurality of different types of additional data;

converting the analog audio data, the analog video data, and the analog additional data, respectively, to digital audio data, digital video data, and digital additional data;

transmitting, to at least one display device, guidance information indicating the plurality of different types of additional data comprised by the analog additional data;

receiving, from the at least one display device, a selection signal indicating a selection of at least one of the plurality of different types of additional data;

configuring a digital transport stream comprising a plurality of packets by separately packetizing the digital audio data, the digital video data, and the digital additional data corresponding to the selection of the at least one of the plurality of different types of additional data, respectively; and transmitting the digital transport stream to the at least one display device.

10. The data transmission method of claim 9, wherein the analog additional data comprises at least one of wide screen signaling (WSS) data, teletext (TTX) data, subtitle data for the hearing impaired, foreign language subtitle data, or aspect ratio setting data of the at least one display device.

11. The data transmission method of claim 9, wherein the configuring of the digital transport stream comprises:

selecting, from the analog additional data, selected additional data to be transmitted to the at least one display device based on the selection signal; and packetizing each of the selected additional data into the digital additional data and add the packetized data in the digital transport stream.

12. The data transmission method of claim 11, wherein the at least one display device comprises a plurality of display devices, and wherein the packetizing of each of the selected additional data comprises:

grouping the plurality of display devices into one or more groups based on the selection signal transmitted by each of the plurality of display devices; and configuring a plurality of digital transport streams comprising distinct additional data corresponding to each of the one or more groups.

* * * * *